Nov. 29, 1955 S. F. VALDES 2,725,421

COLOR TELEVISION RECEIVER WITH NOISE FREE
AND PHASE CORRECTED INDEXING SIGNAL

Filed June 20, 1952

INVENTOR.
SERGIO F. VALDES
BY
Allen V. Hazeltine
ATTORNEY

United States Patent Office 2,725,421

Patented Nov. 29, 1955

2,725,421

COLOR TELEVISION RECEIVER WITH NOISEFREE AND PHASE CORRECTED INDEXING SIGNAL

Sergio F. Valdes, Cambridge, Mass., assignor to Philco Corporation, Philadelphia, Pa., a corporation of Pennsylvania Application June 20, 1952, Serial No. 294,633

13 Claims. (Cl. 178—5.4)

Figures 1, 2:
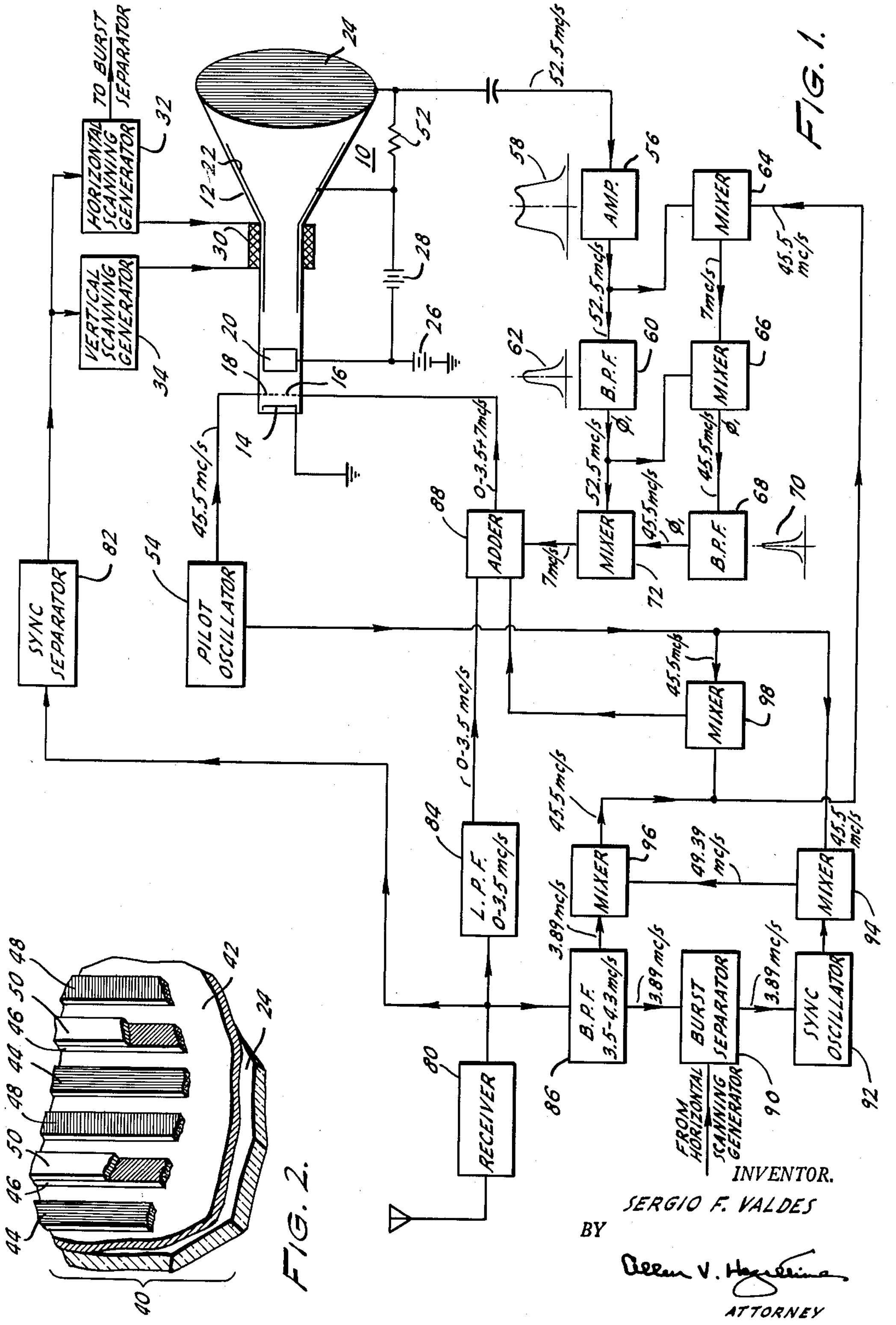

The present invention relates to electrical systems and more particularly to cathode-ray tube systems comprising a beam intercepting structure and indexing means arranged in cooperative relationship with the beam intercepting structure and adapted to produce a signal whose time of occurrence is indicative of the position of the cathode-ray beam.

The invention is particularly adapted for and will be described in connection with, a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normal horizontally-scanning cathode-ray beam produces red, green and blue light successively. From a color television receiver there may then be supplied a video signal wave having signal components definitive of the brightness and chromaticity of the image to be reproduced which wave is utilized to control the intensity of the cathode-ray beam to the required instantaneous value as the beam scans the phosphor stripes.

The video color wave may be generated at the transmitter by means of appropriate camera units producing three signals indicative of three color-specifying parameters of successively scanned elements of a televised scene. These three signals are preferably such as to specify the image colors with respect to three imaginary color primaries "X," "Y" and "Z" as defined by the International Commission on Illumination (ICI). With this choice of primaries, the Y signal represents the brightness of the image as perceived by the human eye, while the X and Z signals contain the remaining intelligence as to image color. Since the specification of any color in terms of any given set of primaries may be converted to a specification of the same color in terms of any other set of primaries by means of linear transformations, the transmission of the X, Y and Z signals makes available at the receiver all of the required information necessary to excite the three real primary-color sources of the image reproducing cathode-ray tube.

In a preferred arrangement for segregating and apportioning the intelligence concerning the X, Y and Z components of the color image at the transmitter, these components are combined to form two difference signals (X—Y) and (Z—Y) which are transmitted in different phase relations as amplitude-modulation of a subcarrier signal. The Y signal is then transmitted in the frequency band located below that of the modulated subcarrier. The modulation of the subcarrier is preferably effected by means of balanced modulators, so that no subcarrier signal is generated when the difference signals (X—Y) and (Z—Y) are zero, i. e., when image elements which are white or gray are scanned. However, when colored image elements are scanned, either or both of the difference signals (X—Y) and (Z—Y) will differ from zero, producing a subcarrier signal having a phase determined by the relative values of the difference signals and hence by the hue of the image, and an amplitude determined by the absolute values of the difference signals and hence by the saturation of the image color. The modulated subcarrier signal therefore may be considered as a chromaticity signal having a phase and amplitude representative of the hue and saturation respectively, of the color of the image.

The instantaneous amplitude of the video signal will be a function of the magnitudes of the three components thereof and of the absolute phase positions of the two components constituting the modulated subcarrier signal, and at any given instant the amplitude is indicative of the intensity of one of the primary color constitutents of an element of the image to be reproduced. For proper color rendition, it is required that, as the phosphor stripe producing a given one of the primary colors of light of a particular image element is impinged by the cathode-ray beam, the intensity of the beam be simultaenously controlled in response to the contemporaneous value of the video signal representing the corresponding color component of the televised image. Such a synchronous relationship may be maintained throughout the scanning cycle by deriving indexing signals indicative of the instantaneous position of the cathode-ray beam upon the image-forming screen, and by utilizing these signals to control the relative phase of the video wave. The said indexing signals may be derived from a plurality of stripe members arranged on the beam intercepting screen structure, each adjacent to a color triplet so that, when the beam scans the screen, the indexing stripes are excited in spaced time sequence relative to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, such indexing stripes may consist of a high atomic number material such as gold, platinum or tungsten or may consist of certain oxides such as cesium oxide or magnesium oxide. Alternatively, the indexing stripes may consist of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

To achieve a desired degree of definition comparable to that commonly available in so-called black-and-white image reproducers, the image reproducing screen of the cathode-ray tube should contain a relatively large number of groups of phosphor stripes. In the case of a cathode-ray tube screen constituted by vertically arranged color triplets, the number of triplets should correspond to the number of picture elements, contained in one line scan of the reproduced image and in a typical case there may be approximately 400 to 450 color triplets arranged on the screen of the cathode-ray tube.

As a general rule, the rate at which the beam scans the phosphor stripes and the associated index stripes can be maintained constant only within certain tolerance values. This is due to the fact that the phosphor stripes and the index stripes are normally deposited on the screen surface with only a certain degree of precision dictated by economic considerations and manufacturing tolerances so that a non-uniform distribution of the stripes on the screen surface can normally be expected. Furthermore, in order to achieve a uniform scanning velocity, it is necessary that the beam deflection signal conform absolutely to a preestablished wave form determined by the geometry of the tube. In this connection, it will be noted that, when the cathode-ray tube is sufficiently long and/or has a sufficiently small screen area so that the normally aspheroidal screen surface is in effect concentric to the effective deflection center of the scanning beam, the deflecting signal must exhibit a linearly varying amplitude. When the screen has approximately 400 color triplets arranged thereon, this linearity must be held to a tolerance of the order of one part in 12,000 to achieve faithful color reproduction. In practice, this problem is much more severe because, desirably, the cathode-ray tube is made relatively short and/or has a large screen area so that the aspheroidal surface of the screen departs considerably from concentricity to the effective deflection center of the beam. In this case, the deflection of the beam at constant velocity over the surface of the screen requires a deflection signal having a more complex waveform and the difficulty of generating such a signal within the necessary close tolerance value is correspondingly increased.

The departures from constant velocity as the beam scans the screen structure produce corresponding changes in the frequency of the indexing signal produced by the screen structure.

In the copending application of E. M. Creamer, Jr., et al., Serial No. 240,324, filed August 4, 1951, now Pat. No. 2,667,534, granted January 26, 1954, there have been described systems by means of which the desired indexing information can be obtained in a readily usable form. More particularly, and in accordance with the principles set forth in the said copending application, use is made of the finding that the scanning of the indexing stripes by the electron beam produces, in the collector circuit of the cathode-ray tube, signal components which represent modulation products as determined by the intensity variations of the beam and the rate of scanning of the index stripes. Accordingly, by additionally varying the intensity of the beam at a pilot carrier rate widely different from the rate at which the beam intensity is varied by the video signal, an output signal is produced in the collector electrode of the cathode-ray tube comprising, as one component, modulation products proportional to the pilot carrier frequency and the rate of scanning the index stripes. Because the frequencies of these modulation products are widely different from the frequencies of any modulation products brought about by the video signal variations of the beam, the former may be separated from the latter by suitable frequency discriminating means. These pilot carrier modulation products consist essentially of a carrier wave at the pilot carrier frequency and sideband signals representing the sum and difference of the pilot carrier frequency and the rate of scanning the index stripes. Since any change in the rate of scanning of the index stripes will be indicated by a change in the frequencies of the sideband signals, the separated signal or one of its sidebands may be used as an indexing signal.

The indexing signal generated by the action of the scanning beam on the screen structure, is a low intensity signal and must be appropriately amplified to make it suitable for controlling the phase of the video signal applied to the beam intensity controlling system in the desired synchronous relationship to the position of the scanning beam. The amplifier used for this purpose, should be characterized not only by having sufficient gain to amplify the indexing signals but also should exhibit a phase characteristic such that the output signals thereof bear the same phasal relationship as the input signals thereof, i. e., the amplifier should exhibit a constant phase shift as a function of frequency over the frequency range of the indexing signal. As a general rule, in order to achieve such a constant phase shift over the frequency range of the indexing signal, the amplifier should have a bandpass characteristic which is wider than that necessary to pass the indexing signal. Furthermore, in order to attenuate spurious signals such as undesired intermodulation products produced at the screen structure, the bandpass characteristic should have sharp attenuation skirts at the edges of its pass band spectrum. It is found that an amplifier having the above noted phase characteristic and limited transmission spectrum has a greater response at the edges of the pass band characteristic so that the components of the noise generated by the indexing structure having frequencies at the edges of the pass band are amplified to a greater extent than the desired indexing signal. In some cases, the degree to which the said noise components are selectively amplified may be sufficient to mask or at least degrade the desired indexing signal to a greater or lesser extent.

As a rule, the circuitry for processing the amplified indexing signal may include one or more frequency selective circuits. These circuits generally apply a phase shift to the indexing signal which varies as a function of the frequency thereof so that the processed signal may no longer be in phase coincidence with the generated indexing signal for all frequency values of the generated signal. In some instances, these undesired phase shifts of the processed indexing signal may be sufficient to produce a serious error of color synchronization between the position of the beam on the screen structure and the contemporaneous value of the color video signal applied to the intensity control system of the cathode-ray tube.

It is an object of the invention to provide improved cathode-ray tube systems of the type in which the position of an electron beam on a beam intercepting screen structure is indicated by an indexing signal derived from an indexing component of the screen structure.

A further object of the invention is to provide improved cathode-ray tube systems of the foregoing type in which an indexing signal is provided which is substantially free of contaminating noise components having frequencies approximating the frequency values of the indexing signal.

Another object of the invention is to provide improved cathode-ray tube systems in which undesired phase variations of the indexing signal normally produced in the processing of the indexing signal are obviated.

Another object of the invention is to provide a color television cathode-ray reproducing system in which accurate color rendition is achieved notwithstanding nonuniformities of the distribution and of the scanning of the color reproducing elements of the image screen of the cathode-ray tube.

These and further objects of the invention will appear as the specification progresses.

In accordance with the invention, the foregoing objects are achieved in a cathode-ray tube system adapted to generate an indexing signal having variations, the nominal time phase positions of which are indicative of the positions of the beam, by means of an indexing system comprising a relatively narrow pass band system which is adapted to exclude noise components from the signal derived from the indexing system of the beam intercepting structure and which normally imparts a phase shift to the indexing signal as a function of the frequency of the indexing signal. The system of the invention further comprises means to derive from the indexing signal a compensating signal which exhibits a phase shift as a function of frequency bearing a desired compensating relationship to the phase shifted noise-free indexing signal, and means to combine the two so produced signals to produce an output signal having the desired indexing information free from noise and free from the undesired phase shifts.

More specifically, and in a preferred embodiment of the invention wherein the indexing signal is produced by scanning the indexing signal producing component of an image screen by means of a beam varying in intensity at a pilot carrier rate, as disclosed in the above referred to copending application of E. M. Creamer, Jr., et al., the foregoing objects are achieved by means of an indexing signal system comprising a frequency band limiting system adapted to derive from the generated indexing signal a first signal which contains the desired indexing information free of noise but which exhibits a phase shift determined by the frequency of the indexing signal. The preferred embodiment of the invention further comprises means to produce a first heterodyne frequency signal representing one intermodulation product of the generated indexing signal and the color information to be applied to the cathode-ray beam, means to produce a second heterodyne signal which represents an intermodulation product of the said first derived signal and the said first heterodyne signal and which exhibits a phase shift characteristic determined by the phase shift characteristic of the first derived signal, means to remove undesired noise components from the second heterodyne signal, and means to produce an output heterodyne signal representing an intermodulation product of the said first derived signal and the noise-free second heterodyne signal. By means of this novel heterodyning system as above specifically outlined, an output signal which is free of undesired phase variations and undesired noise components is produced.

The invention will be described in greater detail with reference to the appended drawings forming part of the specification and in which:

Figure 1 is a block diagram partly schematic showing a preferred embodiment of a cathode-ray tube system in accordance with the invention; and Figure 2 is a perspective view of one form of an image reproducing screen structure suitable for the cathode-ray tube systems of the invention.

Referring to Figure 1, the cathode-ray tube system thereshown comprises a cathode-ray tube 10 containing within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope and terminates at a point spaced from the end face 24 of the tube in conformance with well established practice. Suitable forms of construction for the dual beam generating system have been described in the copending application of M. E. Partin, Serial No. 242,264, filed August 17, 1951 and a further description thereof herein is believed to be unnecessary. Electrodes 20 and 22 are maintained at their desired operating potentials by suitable voltage sources shown as batteries 26 and 28, the battery 26 having its positive pole connected to the anode 20 and negative pole connected to a point at ground potential and the battery 28 being connected with its positive pole to electrode 22 and its negative pole to the positive pole of battery 26. In practice, the battery 26 has a potential of the order of 1 to 3 kilovolts whereas the battery 28 has a potential of the order of 10 to 20 kilovolts.

A deflection yoke 30 coupled to horizontal and vertical deflection signal generators 32 and 34 respectively, of conventional design, is provided for deflecting the dual electron beams across the face plate 24 of the tube to form a raster thereon.

The end face plate 24 of the tube 10 is provided with a beam intercepting structure 40, one suitable form of which is shown in Figure 2. In the arrangement shown in Figure 2, the structure 40 is formed directly on the face plate 24. However, it should be well understood that the structure 40 may be formed on a suitable light transparent base which is independent of the face plate 24 and may be spaced therefrom. In the arrangement shown, the face plate 24, which in practice consists of glass having preferably substantially uniform transmission characteristics for the various colors of the visible spectrum, and having a light transparent electrically conductive coating 42 which may be a coating of stannic oxide or of a metal such as silver, having a thickness only sufficient to achieve the desired conductivity, is provided with a plurality of parallelly arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which upon electron impingement produces red light, the stripe 46 may consist of a phosphor such as zinc orthosilicate, which produces green light, and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the face plate 24, and further details concerning the same are believed to be unnecessary.

Each of the groups of stripes may be termed a color triplet, and as will be noted, the sequence of the stripes is repeated in consecutive order over the area of the structure 40.

Arranged over consecutive stripes 46 are indexing stripes 50 consisting of a material having a secondary-emissive ratio detectably different from that of the remainder of the structure 40. The stripes 50 may be of gold or of other high atomic number metal such as platinum or tungsten, or may be of an oxide such as magnesium oxide as previously pointed out.

The beam intercepting structure so constituted is connected to the positive pole of battery 28 through a load impedance 52 by means of a suitable connection to the conductive coating 42 thereof.

Since the dual cathode-ray beams are deflected by the common deflection yoke 30, they simultaneously scan the beam intercepting structure 40, and indexing information derived from one of the beams may be used to establish the position of the other beam. When one of the beams, such as the beam under the control of the electrode 18 is varied in intensity at a pilot frequency, for example by means of a pilot oscillator 54, the so varied beam will generate across the load resistor 52 an indexing signal comprising a carrier component at the pilot frequency and sideband components representing the sum and difference frequencies of the pilot frequency and the rate at which the index stripes are scanned by the beam as described in the said copending application of E. M. Cramer, Jr., et al.

In a typical case, the pilot frequency variations of the intensity of the beam may occur at a frequency of 45.5 mc./sec. and, when the rate of scanning the index stripes 50 is approximately 7 million per second as determined by the horizontal scanning rate and the number of index stripes 50 impinged per scanning period, a modulated signal at 45.5 mc./sec. and having sideband components at approximately 38.5 mc./sec. and 52.5 mc./sec. is produced across the load resistor 52. Changes in the rate of scanning the index stripes 50 due to non-linearities of the beam deflection and/or non-uniformities of the spacing of the index stripes produce corresponding changes in the frequencies of the sideband components about their respective nominal values so that one of the sidebands may be used as an indexing signal. In the arrangement specifically shown in Figure 1, the upper sideband component i. e., the sideband component at approximately 52.5 mc./sec. is used as the indexing signal.

The indexing signal at approximately 52.2 mc./sec. is a low intensity signal and must be appropriately amplified in order to make it suitable for its subsequent use as a control quantity establishing the synchronous phase relationship between the color image information applied to the cathode-ray tube and the scanning of the phosphor stripes 44, 46 and 48. This may be achieved by means of an amplifier 56. Amplifier 56 should be adapted to amplify the indexing signal at 52.5 mc./sec. at constant gain throughout the frequency spectrum occupied by the indexing signal without phase distortion, and should be further adapted to exclude from the output thereof undesired signals generated at the beam intercepting structure 40 such as the carrier component at 45.5 mc./sec., the lower sideband component at 38.5 mc./sec., and intermodulation products of these signals, of the upper sideband component at 52.5 mc./sec., and of the video information applied to the cathode-ray tube. In order to so limit the bandpass characteristic of the amplifier 56 without phase distortion, it has been found necessary in practice to design the amplifier with a transmission pass band which is wider than that required by the desired indexing signal and which may even have an accentuated response at the edges of the pass band, for example as shown by the curve 58 arranged adjacent to the amplifier 56. The design of an amplifier having such a characteristic is well known to those skilled in the art and a further description thereof is believed to be unnecessary. However, it may be pointed out for the sake of completeness, that amplifier 56 may consist of a wide band amplifier embodying suitable wave traps which establish the limits of the desired pass band of the amplifier and attenuate input signals having frequencies beyond the limits of the pass band.

Due to its extended pass band there will also appear at the output of the amplifier 56 undesired noise signals which are due in part to minor but nevertheless apparent differences in the secondary electron emissivity of the indexing stripes. These noise signals contaminate the indexing signal and may bring about misphasing of the color information applied to the cathode-ray tube. The noise signals so transmitted by the amplifier may be attenuated by a bandpass filter 60 having a transmission characteristic, as shown at 62, only sufficiently wide to pass the desired indexing signal. Because of its relatively narrow bandwidth, however, it is found that the filter 62 imparts a phase shift to the indexing signal which varies as a function of its frequency.

In accordance with the invention, this undesired phase shift is compensated by a frequency heterodyne system in which the phase shifted indexing signal is combined in phase subtractive relationship with a second signal which is derived from the indexing signal and has a corresponding phase shift. More particularly, in the system shown in Figure 1, the output of amplifier 56 is combined in a heterodyne mixer 64 with a signal having a nominal frequency equal to that of the pilot oscillator 54 and derived in a manner later to be more fully described, to produce a first difference frequency signal containing the indexing information and the noise signals appearing at the output of amplifier 56 and further containing the color information to be applied to the cathode-ray tube 10. For the frequency values above specifically illustrated, this heterodyne difference frequency signal may have a nominal frequency of 7 mc./sec. and exhibits the frequency variations of the indexing signal at the output of amplifier 56.

The output of mixer 64 is applied to a second mixer 66 together with the output of bandpass filter 60 to produce a second difference frequency signal i. e., a signal having a nominal frequency of 45.5 mc./sec. It will be noted that this second difference frequency signal carries with it the phase shift $\phi_1$ characterizing the signal at the output of bandpass filter 60, and the color information and the noise components impressed on the 7 mc./sec. signal at the output of mixer 64. However, this second difference frequency signal is substantially free of frequency variations due to the indexing information because the frequency variations of the two signals applied to the mixer 66 are in the same sense, and are cancelled by the subtractive heterodyne action of the mixer 66. The second heterodyne signal so produced may then be applied to a bandpass filter 68 having a relatively sharp pass band characteristic as shown at 70, whereby the undesired noise signals may be removed. Since the signal applied to bandpass filter 68 is substantially free of frequency variations corresponding to the indexing information, there will be substantially no modification of the phase shift $\phi_1$ characterizing the input signal thereof, so that the output signal will contain this same phase shift characteristic.

There is thus seen to exist in the system, at the output of bandpass filter 60, a noise-free signal containing the indexing information in the form of frequency excursions about a nominal frequency value of 52.5 mc./sec. and further containing a phase shift $\phi_1$ varying as a function of frequency as determined by the bandpass filter 60. There also exists in the system, at the output of filter 68, a noise-free signal at a frequency value of 45.5 mc./sec. which signal is substantially free from frequency excursions due to the indexing information, contains a phase shift characteristic similar to that at the output of bandpass filter 60 and contains the color information of the image to be reproduced. These two signals are applied to a mixer 72 to produce a difference frequency signal at 7 mc./sec. This latter difference signal is noise-free, contains the indexing information in the form of frequency variations about the nominal frequency value as in the case of the output signal of amplifier 56, and contains the color information carried by the wave applied to mixer 64. It will further be noted that, in view of the heterodyne action which takes place in the mixer 72, the phase shifts of the two signals applied thereto are combined in subtractive manner so that the 7 mc./sec. signal at the output of mixer 72 is free of these undesirable phase shifts. The signal produced at the output of mixer 72 is accordingly, a signal having a frequency equal to the rate at which successive color triplets of the image intercepting screen 40 (see Figure 2) are scanned by the electron beam and the successive color establishing components thereof have a phase position as established by the indexing signal.

The heterodyne mixers 64, 66 and 72 may conform to standard practice and may each consist for example, of a dual grid thermionic tube to the different grids of which the two input signals are supplied. Each of the mixers may contain an output circuit broadly tuned to the frequency of the desired output signal whereby the desired heterodyne frequency signal may be preferentially selected.

For supplying a color video wave to the control grid 16 there is provided a receiver 80 which may be of conventional design and include the usual radio frequency amplifier, frequency conversion and detector stages for producing a color video signal.

In a typical form, the color video signal comprises time-spaced horizontal and vertical synchronizing pulses recurrent at the horizontal and vertical scanning frequencies, and the color video wave occurring in the intervals between the horizontal pulses. The incoming video signal may further include a marker signal for providing a phase reference for the color establishing component of the color video wave, such a marker being usually in the form of a burst of a small number of cycles of carrier signal having a frequency equal to the frequency of the chromaticity subcarrier component of the video wave and occurring during the so-called back porch interval of the horizontal scanning pulses.

The synchronizing pulses contained in the received video signal are selected by a sync signal separator 82 of conventional form and subsequently energize, in well known manner, the horizontal and vertical scanning generators 32 and 34.

The video color wave may be formed at the transmitter in a number of different manners. Preferably the video wave is generated at the transmitter in accordance with the principles set forth in the copending application of Frank J. Bingley, Serial No. 225,567, filed May 10, 1951. As described in said application the image to be televised is resolved into three color signals, one of which signals is proportional to the energy distribution of the light emitted by the image as weighted by a color mixture curve having a shape and ordinate scale substantially identical to the shape and ordinate scale of the curve of the relative luminosity of the spectral colors to the eye. The second and third color signals are made proportional, respectively, to the energy distribution of the light emitted by the image as weighted by second and third color mixture curves having shapes and ordinate scales complementing the shape and ordinate scale of the first curve. The first of these signals accordingly defines the brightness of the image elements and is a signal having a relatively large bandwidth whereas the remaining two signals define with the first signal the chromaticity of the image and need only be of a relatively small bandwidth. In one of the systems specifically described in the said copending application of Frank J. Bingley, the first of the said signals is utilized directly to form one component of the color video wave without being previously modulated, and the second and third signals, modified by the first signal to produce two difference signals, are modulated in phase quadrature on a subcarrier to produce the modulated wave component of the color video wave.

The video color wave is separated into its two components by means of a low pass filter 84 and a bandpass filter 86 whereby at the output of filter 84 there is derived the low frequency component of the video wave containing the brightness information of the image and at the output of the filter 86 there is derived the modulated subcarrier component of the video wave indicative of the chromaticity information of the image and the marker signal. The frequency pass bands of the filters 84 and 86 are selected in consonance with the standards of the transmission system and a typical value for the pass band of filter 84 is 0 to 3.5 mc./sec. and for the filter 86 is 3.5 to 4.3 mc./sec. when the subcarrier frequency of approximately 3.89 mc./sec. is used at the transmitter.

The brightness signal is supplied to the control grid 16 of the tube 10 through an adder 88 having a plurality of inputs and a common output and consisting, in a typical case, of a plurality of thermionic tubes, the input grid circuits of which are separately energized by the respective input signals applied to the adder and the output anode circuits of which are supplied through a common load impedance.

The chromaticity information is supplied to the electrode 16 from the mixer 72 which forms a second input to the adder 88 and, as previously indicated, this chromaticity information is derived from a signal applied to the mixer 64. This latter signal, having a carrier frequency at 45.5 mc./sec., is derived from the modulated subcarrier of the video wave by means of a system comprising a burst separator 90, a synchronized oscillator 92 and heterodyne mixers 94 and 96.

The burst separator 90 operates to separate the marker signal from the video wave by providing a gated path for the applied input signal during the time of occurrence of the marker signal. Such a gate may consist for example, of a dual grid electron discharge tube having one control grid which is coupled to the output of the bandpass filter 86 and a second control grid so negatively biased as normally to prevent conduction through the tube. The tube is made conductive at the proper instant, i. e., during the back porch interval of the horizontal synchronizing pulses, by means of a positive pulse which may be derived from the output of the horizontal scanning generator 32 in well known manner and which is applied to the said second control grid to override the normal blocking bias. The burst separator may also contain a filter for attenuating undesirable signals at the output thereof, i. e., the separator may contain a resonant circuit which is tuned to the frequency of the marker signal and which is connected to the anode of the tube.

The marker signal so provided is applied to the oscillator 92 adapted to generate a signal having a frequency and a phase position as established by the frequency and phase position of the marker signal applied to the input thereof. In a suitable form the oscillator 92 may be of the type described in the copending application of Joseph C. Tellier, Serial No. 197,551, filed November 25, 1950.

The output of oscillator 92 is applied to the heterodyne mixer 94 together with a signal from the pilot oscillator 54 to produce a heterodyne signal at 49.39 mc./sec. which signal has the color phase information as established by the color phase marker signal of the video signal derived from the receiver 80. This heterodyne signal is in turn supplied to a heterodyne mixer 96 together with the color modulated subcarrier of the video wave as derived from the bandpass filter 86 to produce an output wave at the frequency of the pilot wave from oscillator 54, i. e., an output wave at 45.5 mc./sec. This latter output wave exhibits phase and amplitude variations as determined by the phase and amplitude variations of the color modulated subcarrier derived from the bandpass filter 86, and the absolute phase position of these variations are established with reference to the brightness signal from low pass filter 84 by means of the color marker signal.

The heterodyne mixers 94 and 96 may be of conventional form and may each consist of a dual grid tube as previously described in connection with the mixers 64, 66 and 72.

The chromaticity information impressed on a signal at the pilot frequency as above described is applied to the mixer 64. In the manner previously described, this information is combined with the indexing information derived from the amplifier 56 to produce a signal the color information of which is arranged in synchronism with the scanning of the beam under the control of the electrode 16, the so synchronized information being applied to the control electrode 16 from the mixer 72 through the adder 88.

When the information at the output of the low pass filter 84 and the chromaticity information appearing on the color subcarrier derived from bandpass filter 86 are in terms of the imaginary color primaries X, Y and Z, as in the case of the preferred receiving system above specifically described, it may be necessary to modify these signals to make them conform to the particular real primary colors R, G and B characterizing the phosphor stripes utilized in the screen assembly 40 (see Figure 2) of the cathode-ray tube. This may be accomplished by synchronously detecting the color carrier at a particular phase and adding the detection products in proper relative amounts to the imaginary color primary signals. For example, as shown in Figure 1, the color modulated wave at the pilot frequency as derived from the mixer 96, and a demodulating signal at the pilot frequency as derived from the oscillator 54 may be synchronously detected by a mixer 98 and the detected products so produced applied as an additional input to the adder 88. The mixer 98, which may consist of a dual grid tube as in the case of the mixers previously described, may include a conventional phase shifter for either or both of the input signals thereof to vary the relative phases of the signals and may further include an amplifier in the output circuit to establish the amplitude of the output signal at the proper value relative to the amplitudes of the signals supplied to the adder 88 from the low pass filter 84 and the mixer 72. As will be apparent to those skilled in the art, the actual value of the phase shift and the amplification taking place in the mixer 98 is determined by the particular primary colors produced by the cathode-ray tube 10 and these quantities may be readily calculated.

The transformation from a color system based on primaries X, Y and Z to a specific real primary color system may be achieved in ways other than that above specifically described. Such other methods which form no part of the present invention need not be specifically described herein. However, for the sake of completeness reference is made to the copending application of E. M. Creamer, Jr., Serial No. 256,526, filed November 15, 1951, now Patent No. 2,681,381, granted June 15, 1954, describing several such alternate methods.

Various modifications of the specific embodiment of the invention above described may be readily derived by those skilled in the art without departing from the underlying principles thereof. More particularly, whereas in the system of Figure 1, the mixer 64 is supplied with a color signal produced as a heterodyne modulation product of the color subcarrier and the pilot signal from oscillator 54, so that the color information is combined with the indexing information and appears at the output of mixer 72, it will be evident that, alternatively, the mixer 64 may be supplied by a signal derived solely from the oscillator 54. In such a modification, the output of mixer 72, which in this case contains only the indexing information, may then be combined with the color information. This may be achieved by supplying the mixer 94 with the 7 mc./sec. output signal from mixer 72 instead of the 45.5 mc./sec. signal from the oscillator 54. Under these conditions, the output of mixer 96 will be a 7 mc./sec. signal containing the color and indexing information which may be supplied directly to the adder 88. The transformation of the color system from primaries based on X, Y and Z to specific real primaries may be accomplished by an appropriate system adapted to this modified mode of operation, such as by the square law detection method described in the said copending application of E. M. Creamer, Jr., Serial No. 256,526.

Alternatively, in a system in which the receiver 80 provides three video waves each indicative of the amplitude of a respective one of the primary color components of the image, the 7 mc./sec. signal from the output of mixer 72 containing only indexing information in accordance with the above described modification, may be used as a modulating or switching signal to consecutively apply the color video waves to the control electrode 16 through suitable modulators energized by the respective video waves and by the 7 mc./sec. signal supplied thereto through appropriate phase shifters.

Briefly summarizing the system specifically shown in Figure 1, it will be seen that there is produced by the screen structure of the cathode-ray tube 10 a first signal having a first component at a given nominal frequency value determined by the intensity variations of the beam produced by the oscillator 54 and by the nominal rate of scanning the indexing stripes. This first component undergoes frequency variations as determined by the variations of the rate of scanning of the indexing stripes. The action of the bandpass filter 60 brings about a second signal having the nominal frequency and frequency variations of the first component of the first signal and further having phase variations determined by the frequency variations above noted. By means of the mixer 64 a third signal is produced which has a second nominal frequency value and has frequency variations determined by the above-noted frequency variations characterizing the first signal. The second and third signals are combined by the mixer 66 to produce at the output of mixer 66 a first heterodyne signal having a third nominal frequency value and having phase variations determined by the frequency variations of the first component of the first signal; i. e. having the phase variations exhibited by the signal at the output of bandpass filter 60. By means of the mixer 72 the second signal appearing at the output of filter 60 is combined with the first heterodyne signal appearing at the output of mixer 66 to produce a second heterodyne signal which is applied to the adder 88. It will be noted that this second heterodyne signal exhibits about a fourth nominal frequency value, the frequency variations of the second signal at the output of filter 60 and has phase variations equal to the difference between the phase variations exhibited by the second signal and the phase variations exhibited by the first heterodyne signal produced by mixer 66.

While I have described my invention in a specific embodiment and by means of specific examples, I do not wish to be limited thereto for obvious modifications will occur to those skilled in the art without departing from the spirit and scope of the invention.

What I claim is:

1. An electrical system comprising a source of a first signal having a component at a given nominal frequency value and undergoing frequency variations about said nominal frequency value, a signal transmission path coupled to said source, said transmission path having a phase characteristic which varies as a function of the frequency of a signal applied thereto, whereby, when energized by said component of said first signal, said path produces a second signal at said nominal frequency value having said frequency variations and having phase variations determined by the frequency variations of the said component, means for deriving from said first signal a third signal having a second nominal frequency value and having frequency variations about said second nominal frequency value determined by said first mentioned frequency variations, means for combining said second and third signals to produce a first heterodyne signal having a third nominal frequency value and having phase variations determined by the frequency variations of said component, and means for combining said second signal and said first heterodyne signal to produce a second heterodyne signal having a fourth nominal frequency value, said second heterodyne signal having frequency variations about said fourth nominal value determined by the said first mentioned frequency variations and having phase variations equal to the difference between the phase variations of said second signal and the phase variations of said first heterodyne signal.

2. An electrical system as claimed in claim 1 wherein the nominal frequency of said first heterodyne signal has a value equal to the differnce between the nominal frequencies of said second and third signals, and the nominal frequency of said second heterodyne signal has a value equal to the difference between the nominal frequencies of said second signal and said first heterodyne signal.

3. An electrical system as claimed in claim 1 wherein said first signal comprises a second component having frequency values circumjacent to the frequency values of said first component, wherein said transmission path comprises frequency bandwidth limiting means adapted to attenuate said second component of said second signal, wherein said third signal and said first heterodyne signal each comprises a further component determined by the said second component of said first signal, and further comprising means interposed between said first heterodyne signal producing means and said second heterodyne producing means for attenuating said further component of said first heterodyne signal.

4. An electrical system as claimed in claim 1 wherein said third signal is a heterodyne product of said first signal and of another signal and has a nominal frequency value equal to the difference of the frequencies of said first signal and said other signal, and wherein said second heterodyne signal has a nominal frequency equal to the said difference frequency of said first signal and said other signal.

5. A cathode-ray tube system comprising a cathode-ray tube having a member adapted to intercept electrically charged particles, means for generating electrically charged particles and for directing the same in beam formation towards said intercepting member and means for varying the flow of said particles from said generating means, said intercepting member having first portions thereof arranged in a given geometric configuration and having a first response characteristic upon impingement by said charged particles, said member further having second portions thereof arranged in a second geometric configuration indicative of said first configuration and having a second given response characteristic upon impingement by said particles different from said first characteristic, means for scanning said charged particles in beam formation across said intercepting member at a given nominal rate to thereby energize said first and second elemental areas, means for varying the flow of said charged particles from said generating means at a given rate, means for deriving from said intercepting member a control quantity having a component determined by the response characteristic of said second portions, said component having a nominal frequency determined by the said rate of varying the flow of said charged particles and by the rate of scanning said second portions and having frequency variations about said nominal frequency determined by variations of the rate of scanning said second portions, a transmission path having a phase characteristic which varies as a function of the frequency of a signal applied thereto, thereby producing phase variations of said applied signal as determined by the frequency of said applied signal, means for applying said component of said control quantity to said path, thereby to produce a second signal having the said nominal frequency of said component and having frequency variations and phase variations determined by the frequency variations of said component, means for deriving from said control quantity a third signal having a second nominal frequency value and having frequency variations about said nominal frequency value determined by said first mentioned frequency variations, means for combining said second and third signals to produce a first heterodyne signal having a third nominal frequency value and having phase variations determined by the frequency variations of said component, and means for combining said second signal and said first heterodyne signal to produce a second heterodyne signal having a fourth nominal frequency value, said second heterodyne signal having frequency variations about said fourth nominal value substantially equal to the first mentioned frequency variations and having phase variations equal to the difference between the phase variations of said second signal and the phase variations of said first heterodyne signal.

6. A cathode-ray tube system as claimed in claim 5 wherein said third signal is a heterodyne product of the said component of said control quantity and of another signal having a nominal frequency proportional to the said rate of varying the flow of said charged particles, wherein the nominal frequency of said first heterodyne signal has a value equal to the difference between the nominal frequencies of said second and third signals, and wherein the nominal frequency of said second heterodyne signal has a value equal to the difference between the nominal frequencies of said second signal and said first heterodyne signal.

7. A cathode-ray tube system as claimed in claim 5 further comprising means for coupling said second heterodyne signal to said cathode-ray tube to further vary the flow of said charged particles at a rate determined by the frequency of said second heterodyne signal.

8. A cathode-ray tube system comprising a cathode-ray tube having a member adapted to intercept electrically charged particles, means for generating electrically charged particles and for directing the same in beam formation towards said intercepting member and means for varying the flow of said particles from said generating means, said intercepting structure having first elemental areas thereof arranged in a given geometric configuration and having a first response characteristic upon impingement by said charged particles, said member further having second elemental areas thereof arranged in a second geometric configuration indicative of said first configuration and having a second given response characteristic upon impingement by said particles different from said first characteristic, means for scanning said charged particles in beam formation across said intercepting member at a given nominal rate to thereby energize said first and second elemental areas, means for varying the flow of said charged particles from said generating means at a given rate, means for deriving from said intercepting member a first signal having a first component thereof determined by the response characteristic of said second portions, said component having a nominal frequency determined by the said rate of varying the flow of said charged particles and by the rate of scanning said second portions and having frequency variations about the said nominal frequency determined by variations of the rate of scanning said second portions, said first signal having a second component thereof having frequency values circumjacent to the frequency values of said first component, a transmission path having a frequency pass band adapted to transmit said first component and to attenuate said second component, said path having a phase characteristic which varies as a function of the frequency of a signal applied thereto, thereby producing phase variations of said signal applied thereto as determined by the frequency of said applied signal, means for applying said first signal to said path to thereby produce a second signal having a nominal frequency and frequency variations equal to the nominal frequency and frequency variations of said first component and having phase variations as determined by the frequency variations of said first component, means for combining said first component and a wave having a nominal frequency value equal to the said rate of varying the intensity of flow of said charged particles to produce a first heterodyne signal having a first component having a nominal frequency equal to the difference of the nominal frequencies of first component of said first signal and said wave, said first component of said heterodyne signal having frequency variations as determined by the frequency variations of the first component of said first signal and said heterodyne signal having a second component with frequency values circumjacent to the frequency values of the first component of said heterodyne signal as determined by the said second component of said first signal, means for combining said second signal and said first heterodyne signal to produce a second heterodyne signal having a first component having a nominal frequency equal to the difference of the nominal frequencies of said second signal and the first component of said first heterodyne signal and having a second component with frequency values circumjacent to the frequency values of the first component of the second heterodyne signal, a second transmission path having a pass band adapted to transmit said first component of said second heterodyne signal and to attenuate the second component thereof, means coupled to the outputs of said first and second transmission paths for producing a third heterodyne frequency signal having a nominal frequency equal to the difference of the nominal frequencies of said second signal and of the first component of said second heterodyne signal, and means for supplying said third heterodyne signal to said cathode-ray tube to further vary the flow of said charged particles at a rate determined by the frequency of said third heterodyne signal.

9. A cathode-ray tube system as claimed in claim 8 wherein said wave having a nominal frequency value equal to the said rate of varying the intensity flow of said charged particles has amplitude and phase variations indicative of desired variations of the said characteristic of said first elemental areas.

10. A cathode-ray tube system for reproducing a color television image as defined by a color video wave having first and second components indicative of picture intelligence, comprising a cathode-ray tube having an electron beam intercepting member, means for generating electrons and for directing the same in beam formation towards said beam intercepting member and means for varying the flow of electrons from said generating means, said intercepting member comprising first portions each comprising a plurality of stripes of fluorescent material arranged in substantially parallel relationship, said stripes being constructed to produce light of different colors in response to electron impingement, said member further comprising second portions spaced apart substantially parallel to said fluorescent stripes and having a response characteristic upon electron impingement different from the response characteristic of said first portion, means for scanning said electrons in beam formation across said beam intercepting member at a given nominal rate to thereby energize said first and second portions, a source of a first signal coupled to said tube for varying the flow of electrons from said generating means at a first given frequency, means for deriving from said intercepting member a second signal having one component thereof determined by the response characteristic of said second portions and having a second component having frequency values circumjacent to the frequency values of the first component thereof, said first component of the second signal having a second nominal frequency determined by the frequency of said first signal and by the rate of scanning said second portions and having frequency variations about said second nominal frequency value determined by variations of the rate of scanning said second portions, amplifying means energized by said second signal, a bandpass filter system coupled to said amplifying means and adapted to transmit said first component and attenuate said second component of said second signal, a first mixed coupled to the output of said amplifier means and energized by a third signal having a nominal frequency equal to the frequency of said first signal and adapted to produce a first heterodyne difference frequency signal, a second mixer coupled to the said filtering means and to said first mixer and adapted to produce a second heterodyne frequnecy signal bandpass filtering means coupled to the output of said second mixing means and adapted to attenuate signals having frequency values departing by a given amount from the frequency of the difference frequency signal produced by said second mixer, third mixing means coupled to said first and second mentioned filtering means and adapted to produce a third heterodyne signal, and means for applying said third heterodyne signal to said cathode-ray tube to further vary the flow of said electrons at a rate determined by the frequency of said third heterodyne signal.

11. A cathode-ray tube system as claimed in claim 10 wherein the said third signal energizing said first mixer is characterized by amplitude and phase variations as determined by the said second component of said color video wave.

12. A cathode-ray tube system for reproducing a color television image as defined by a color video wave having first and second components indicative of picture intelligence, comprising a cathode-ray tube having an electron beam intercepting member, means for generating electrons and for directing the same in beam formation towards said beam intercepting member and means for varying the flow of electrons from said generating means, said intercepting member comprising first portions each comprising a plurality of stripes of fluorescent material arranged in substantially parallel relationship and constructed to produce light of different colors in response to electron impingement, said member further comprising second stripe portions spaced apart substantially parallel to said fluorescent stripes and having a response characteristic upon electron impingement different from the response characteristic of said first portions, means for scanning said electrons in beam formation across said beam intercepting member at a given nominal rate to thereby energize said first and second portions, a source of a first signal coupled to said tube to vary the said flow of electrons from said generating means at a first given frequency, means for deriving from said intercepting member a second signal having a first component thereof determined by the response characteristic of said second portions, said first component having a second nominal frequency determined by the frequency of said first signal and by the rate of scanning said second portions and having frequency variations about said second nominal frequency value determined by variations of the rate of scanning said second portions, said second signal having a second component having frequency values circumjacent to the frequency values of said first component of said second signal, a transmission path energized by said second signal, said path having a frequency pass band characteristic transmitting said first component and attenuating said second component of said second signal and being constructed to produce phase variations of said first component as determined by the frequency variations thereof, means for combining said second component of said video wave and said first signal to produce a third signal having a nominal frequency equal to the frequency of said first signal and having amplitude and phase variations determined by the said second component of said video wave, means for combining said first component of said second signal and said third signal to produce a first heterodyne difference frequency signal having amplitude and phase variations as determined by the second component of said color video wave, means for combining said first heterodyne signal and said first component of said second signal to produce a second heterodyne difference frequency signal having phase variations as determined by the frequency variations of said first component of said second signal and having amplitude and phase variations as determined by the said second component of said color video wave, means for combining said first component of said second signal and said second heterodyne signal to produce a third heterodyne difference frequency signal, and means for applying said first component of said color video wave and said third heterodyne signal to said cathode-ray tube to further vary the flow of electrons from said generating means.

13. An electrical system comprising a source of a first intelligence signal having a given nominal frequency, said first signal being subject to frequency variations about said nominal frequency; a transmission path supplied with said first signal and responsive thereto to produce a second signal of predetermined nominal frequency, subject to said frequency variations of said first signal and also subject to phase variations bearing a predetermined relationship to said frequency variations; means for deriving from said first signal a third signal having a nominal frequency which differs from that of said second signal by a predetermined amount and having substantially the same frequency and phase variations as said second signal; means for heterodyning said second signal with said third signal; and means for deriving selectively from said heterodyning means the heterodyne components produced at a nominal frequency equal to the difference between the nominal frequencies of said second and third signals.

References Cited in the file of this patent

UNITED STATES PATENTS

| | | |
|---|---|---|
| 2,530,275 | Weingarten | Nov. 14, 1950 |
| 2,545,325 | Weimer | Mar. 13, 1951 |